Patented June 13, 1944

2,351,390

UNITED STATES PATENT OFFICE 2,351,390

PROCESS OF PREPARING CARBON TETRAFLUORIDE

Anthony F. Benning, Woodstown, N. J., and Joseph D. Park, Wilmington, Del., assignors to Kinetic Chemicals, Inc., Wilmington, Del., a corporation of Delaware No Drawing. Application September 15, 1942, Serial No. 458,446

4 Claims. (Cl. 260—653)

This invention relates to the preparation of carbon tetrafluoride and more particularly to the preparation of carbon tetrafluoride by pyrolytic oxidation.

It is an object of this invention to prepare carbon tetrafluoride, which is represented by the formula $CF_4$, by a process which is superior in its technical and economic aspects to previously known processes.

The objects of the invention are accomplished, generally speaking, by burning tetrafluoro-ethylene in an atmosphere comprising or consisting of oxygen. In addition to the oxygen, there may be present inert gases. For instance, the reaction can be carried out by a reaction with the oxygen of the atmosphere, in an atmosphere of pure oxygen, or in an atmosphere of oxygen admixed with certain inert gases, such as nitrogen. The reaction is probably:

$$CF_2=CF_2 + O_2 \rightarrow CO_2 + CF_4$$

It is preferred to carry out the combustion in an atmosphere of pure oxygen in excess as it offers the least difficulty and expense in the isolation of the product $CF_4$. It is possible to use gas mixtures but in general they contaminate the combustion products or so dilute them that the cost of isolation is increased. For example, if chilling is resorted to, the expense of isolating compounds diluted with nitrogen is very great and condenser capacity must be very high. It is generally preferred to use a volume of oxygen at least equal to that of tetrafluoro-ethylene, since the latter is then entirely consumed and the separation of carbon tetrafluoride from the starting material is not necessary. It is possible to carry out the combustion with an excess of tetrafluoro-ethylene but in the presence of this deficiency of oxygen the reaction may become

$$2CF_2=CF_2 + O_2 \rightarrow 2CO + 2CF_4$$

The very toxic nature of CO represents an additional objection to this method.

The following examples illustrate the invention but do not limit it.

Example I

Tetrafluoro-ethylene is burned with about three times its volume of oxygen and the product collected in a gasometer. This reaction should be carried out in inert material such as graphitic carbon, platinum, or resistant alloys. The tetrafluoro-ethylene burns with a free flame, attended by the liberation of large quantities of heat. The collected gases are passed through soda lime towers to remove the carbon dioxide. The remaining gas is then chilled with liquid nitrogen to freeze out the carbon tetrafluoride and the oxygen pumped off, leaving carbon tetrafluoride behind. A molecular weight determination by vapor density checked the calculated value, indicating high purity of the product.

Example II

Tetrafluoro-ethylene is burned with two-thirds of its volume of oxygen. The combustion gases are collected, purified by passage through soda lime towers and condensed in liquid air. Upon fractionation, carbon tetrafluoride is separated from unchanged tetrafluoro-ethylene. The combustion with a deficiency of oxygen proceeds smoothly and does not give rise to carbon or other intermediate decomposition products.

As many apparently widely different embodiments of this invention may be made without departing from the spirit and scope thereof, it is to be understood that we do not limit ourselves to the specific embodiments thereof except as defined in the appended claims.

We claim:

1. The process of producing $CF_4$ which comprises burning $CF_2=CF_2$ in an excess of oxygen, in an inert reaction chamber, contacting the products of combustion with soda lime, chilling the products issuing from the soda lime treatment and isolating the $CF_4$ by fractionation.

2. The process of producing $CF_4$ which comprises burning $CF_2=CF_2$ in an excess of oxygen, removing $CO_2$ from the products of combustion, and isolating the $CF_4$.

3. The process of producing $CF_4$ which comprises burning $CF_2=CF_2$ in an atmosphere comprising oxygen, contacting the products of combustion with soda lime, and isolating the $CF_4$.

4. The process of producing $CF_4$ which comprises burning $CF_2=CF_2$ in an atmosphere comprising oxygen, and isolating the $CF_4$.

ANTHONY F. BENNING.
JOSEPH D. PARK.